Patented Dec. 11, 1945

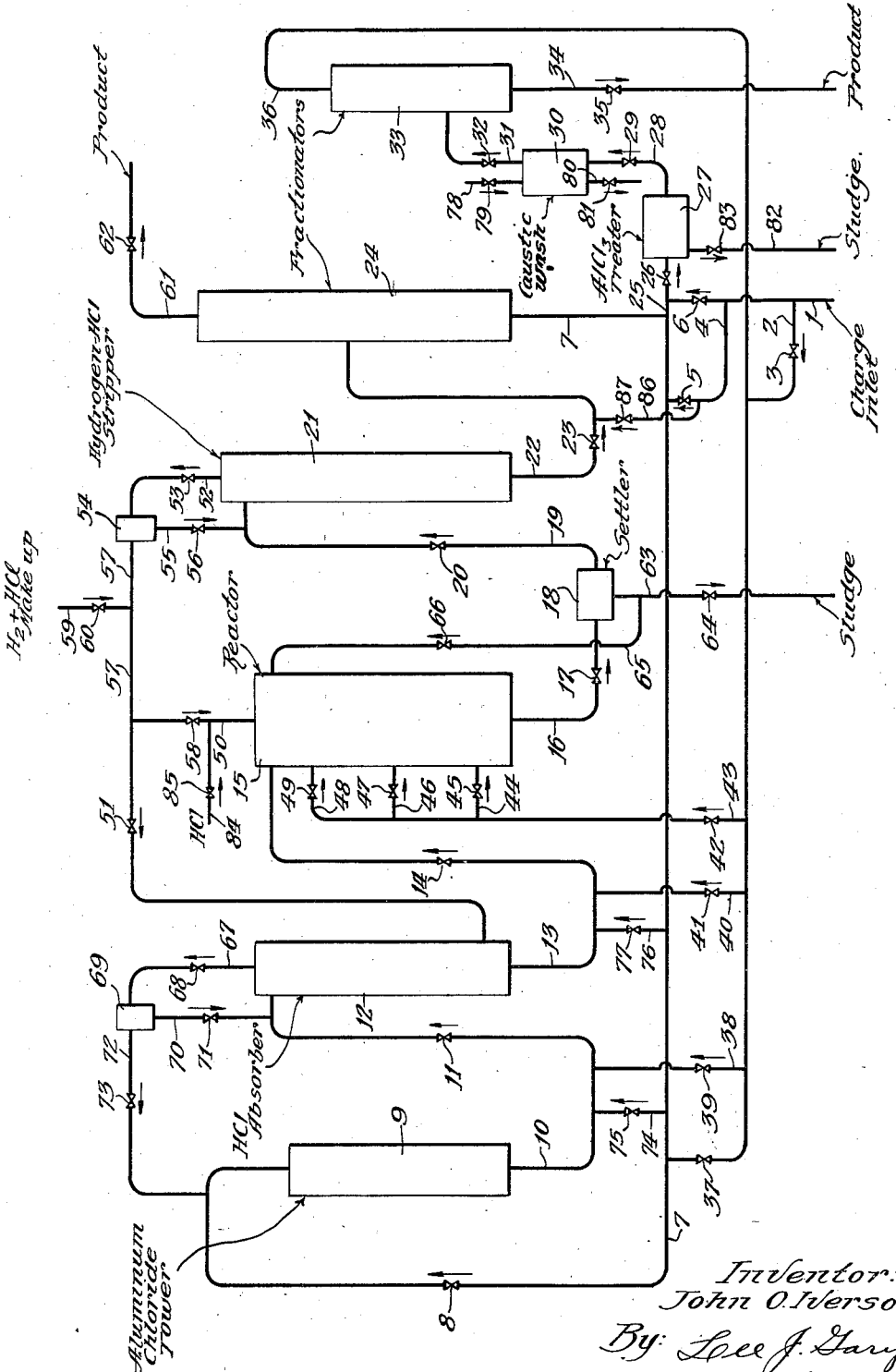

2,390,883

UNITED STATES PATENT OFFICE 2,390,883

ISOMERIZATION OF SATURATED HYDROCARBONS

John O. Iverson, Chicago, Ill., assignor to Universal Oil Products Company, Chicago, Ill., a corporation of Delaware Application October 7, 1942, Serial No. 461,131

16 Claims. (Cl. 260—683.5)

This invention relates to the isomerization of saturated hydrocarbons and deals more specifically with the isomerization of saturated hydrocarbons wherein hydrogen is introduced into the reaction zone to prevent extensive decomposition of the hydrocarbons.

The isomerization of saturated hydrocarbons, particularly paraffinic hydrocarbons has become increasingly important in the past few years. In this reaction the normal or mildly branched chain paraffins undergo a molecular rearrangement to form highly branched chain molecules. In general, these highly branched chain molecules are considerably more reactive than their normal or less branched chain counterparts and are extensively used in the preparation of high antiknock motor fuels by the alkylation of the isoparaffins, particularly isobutane and isopentane with olefinic hydrocarbons. The isomerization reaction has also been utilized for the reforming of saturated hydrocarbon mixtures containing paraffins and naphthenes such as straight run gasolines and naphthas or fractions thereof to increase the antiknock value of these mixtures.

This reaction has generally been conducted using a combination catalyst comprising metallic halides of the Friedel-Crafts type promoted by hydrogen halides with the more frequent combination being aluminum chloride and hydrogen chloride. Other combinations such as the chlorides and bromides of zirconium, iron and zinc either alone or admixed with aluminum chloride and activated by hydrogen chloride or hydrogen bromide have also been used.

In the ordinary method of operation considerable decomposition of the hydrocarbons is obtained as the result of numerous side reactions which occur simultaneously with the isomerization reaction.

This decomposition not only materially decreases the effective yield of the process because of the degradation of a portion of the charging stock, but has the additional disadvantage in that it increases the catalyst consumption.

The fragmental hydrocarbons formed by the decomposition of the charging stock unite with the catalyst to form a hydrocarbon-catalyst complex commonly termed "sludge." Various methods of operation have been used in an attempt to decrease or eliminate this sludge formation during the isomerization. A particularly effective method is the introduction of hydrogen into the reaction zone which tends to hydrogenate the fragmental hydrocarbons and prevent their uniting with the catalyst. However, in the ordinary use of this operation considerable amounts of hydrogen are used which increases the cost of the operation materially. The present invention discloses an improved operation wherein the beneficial effects of the presence of hydrogen in the reaction zone are obtained with a minimum amount of hydrogen being present, thereby substantially decreasing the cost of the operation. The present invention also provides a simple method of separating the hydrogen from the other materials so that it may be recycled to the reaction zone.

In one embodiment the present invention relates to a process for the isomerization of an isomerizable saturated hydrocarbon which comprises contacting said hydrocarbon with an aluminum chloride catalyst disposed within a catalyst zone in the presence of hydrogen under conditions regulated to form an aluminum chloride-hydrocarbon mixture containing an amount of aluminum chloride sufficient to effect subsequent isomerization, maintaining a liquid level of the aluminum chloride hydrocarbon mixture within said catalyst zone, contacting a portion of said catalyst-hydrocarbon mixture within an absorption zone with a mixture of hydrogen chloride and hydrogen obtained as hereinafter set forth, withdrawing the hydrogen substantially free from hydrogen chloride from the absorption zone and introducing said hydrogen into the catalyst zone, introducing the hydrocarbon-aluminum chloride mixture containing absorbed hydrogen chloride into a reaction zone maintained under isomerizing conditions of temperature and pressure in the presence of hydrogen and hydrogen chloride, maintaining a liquid level of the reaction products in said reaction zone, withdrawing a portion of the liquid reaction products from said reaction zone, separating the hydrogen and hydrogen chloride from said reaction products, recycling said separated hydrogen and hydrogen chloride into said absorption zone as hereinbefore set forth, and separating the isomerized hydrocarbons from the unconverted hydrocarbons which may be recycled to the reaction zone.

The present invention is more clearly explained in the description of the accompanying drawing which diagrammatically illustrates in conventional side elevation one type of apparatus in which the objects of the present invention may be accomplished. For simplification, such units as furnaces, pumps, heat exchangers, condensers, etc., which are non-essential to the explanation have been eliminated from the drawing. For further simplification, the drawing will be described relative to a pentane isomerization process. However, it should be understood that this simplification does not place any undue limitation upon this invention since the apparatus described is adaptable to the isomerization of other saturated isomerizable hydrocarbons included within the broad scope of this invention.

Referring to the drawing, the normal pentane is introduced through line 1 and line 2 containing valve 3 into line 36. Alternatively, the normal pentane may be introduced from line 1 through line 4 containing valve 5 into line 7 or from line 1 through valve 6 into line 25. The point of introduction of the normal pentane will be dependent primarily upon the character of the charging stock being used. If, for example, the charge contains a considerable amount of isopentane, it will be introduced through line 86 containing valve 87 directly into fractionator 24 wherein the isopentane is separated from the normal pentane. On the other hand, if a considerable amount of unsaturated materials is present in the charging stock, the charge will be introduced through line 25 containing valve 26 into aluminum chloride treater 27 where it is contacted with an aluminum chloride-hydrocarbon solution formed as hereinafter set forth. The term unsaturates as used in this specification and appended claims is intended to include both olefinic and aromatic hydrocarbons. The unsaturated hydrocarbons react with the aluminum chloride to form aluminum chloride-hydrocarbon complexes which settle out of the hydrocarbon stream. These complexes are removed through line 82 containing valve 83 and may be recovered as a product of the reaction or may be recycled to reactor 15. The normal pentane charge along with unconverted normal pentane and higher boiling hydrocarbons formed as hereinafter set forth from fractionator 24 leave the aluminum chloride treater 27 through line 28 containing valve 29 and pass through the caustic wash chamber 30 wherein the remaining portions of aluminum chloride are removed by neutralization with the caustic. The caustic treated stream leaves chamber 30 through line 31 containing valve 32 and is introduced into fractionator 33 wherein the heavier hydrocarbons are separated from the normal pentane and withdrawn through line 34 containing valve 35. These heavier hydrocarbons are recovered as a product of the reaction. The normal pentane charge substantially free from unsaturated materials leaves fractionator 33 through line 36 and valve 37 into line 7 and is directed through valve 8 into aluminum chloride tower 9 along with hydrogen introduced as hereinafter set forth.

The liquid pentane passes down through a catalyst bed disposed in tower 9 and dissolves a sufficient amount of aluminum chloride to promote isomerization in a subsequent reaction zone. The amount of catalyst dissolved in the pentane is dependent upon the temperature at which the catalyst tower is maintained which will be controlled by the catalyst concentration desired in the subsequent reaction zone. Ordinarily, the temperature will be within the range of 100 to 300° F. A pressure of hydrogen sufficient to maintain the pentane in a liquid phase is maintained in the aluminum chloride tower 9. One of the features of the present invention is the maintenance of a liquid level of the aluminum chloride-pentane solution within catalyst zone 9 so that the amount of hydrogen removed from said zone will be only that portion soluble in the pentane-catalyst mixture under the particular conditions of operation.

Although only one aluminum chloride tower is shown in the drawing, more than one may be employed continuously or intermittently. Thus, while the pentane and hydrogen are being introduced through aluminum chloride tower 9 in order to introduce the catalyst into reactor 15, another chamber similar to catalyst tower 9 may be emptied, cleaned and refilled with a fresh charge of aluminum chloride so that the duplicate tower may be used in place of tower 9 when it becomes necessary to clean and recharge the same.

The catalyst-hydrocarbon mixture containing hydrogen dissolved therein leaves chamber 9 through line 10 and is directed through valve 11 into the hydrogen chloride absorber 12 where it contacts a hydrogen and hydrogen chloride mixture introduced through line 57 containing valve 51. The hydrogen chloride is dissolved in the aluminum chloride-pentane mixture while the hydrogen, substantially free from hydrogen chloride is withdrawn through line 67 containing valve 68 into receiver 69 wherein any entrained liquid is removed from the hydrogen stream. The hydrogen is withdrawn from receiver 69 through line 72 containing valve 73 and is commingled with the pentane charge being introduced into aluminum chloride tower 9. The liquid in receiver 69 is withdrawn through line 70 containing valve 71 and commingled with the aluminum chloride-pentane solution from aluminum chloride tower 9. The aluminum chloride-pentane mixture containing hydrogen chloride and hydrogen dissolved therein, leaves absorber 12 through line 13 containing valve 14 and is introduced into reactor 15 wherein a substantial portion of the pentane is converted to isopentane, in the presence of hydrogen and hydrogen chloride being introduced into reactor 15 through line 56 containing valve 58.

It may be desirable under certain conditions of operation to limit the hydrogen being introduced into reactor 15 to the amount dissolved in the pentane aluminum chloride mixture. This may be accomplished by closing valve 58 and introducing the necessary hydrogen chloride through line 84 containing valve 85.

Reactor 15 will be maintained under conditions such that extensive isomerization occurs without excessive decomposition of the normal pentane. The temperature within reactor 15 will vary within the approximate range of 50 to 300° F. The hydrogen pressure within reactor 15 will vary depending upon the temperature of the operation but will be sufficient to maintain the pentane in a mixed or substantially liquid phase. The hydrogen chloride concentration will ordinarily be less than 40 mol percent of the pentane charge.

Reactor 15 may comprise a large vessel packed with materials such as quartz chips, granular silica-alumina composites, alumina, activated charcoal, crushed fire-brick, and other conventional packing materials or materials providing a large surface area such as spongy iron and other metals. Alternately, reactor 15 may be a large chamber having some means therein which will provide sufficient contact between the catalyst and hydrocarbon to produce the desired degree of isomerization. One of the essential features of this invention is the maintenance of a liquid level of reaction products in reactor 15. By operating in this manner the amount of hydrogen withdrawn from the reaction zone which must later be separated and recycled to the reaction zone is held at a minimum. The amount withdrawn will be controlled solely by the solubility of the hydrogen in the isomerized product which in turn will be controlled by the temperature and pressure of the operation.

The reaction products containing some aluminum chloride, hydrogen and hydrogen chloride dissolved therein along with minor amounts of sludge are withdrawn from reactor 15 through line 16 containing valve 17 and are directed into settler 18 wherein the aluminum chloride sludge is removed from the remaining products. These products, substantially sludge free, are withdrawn from settler 18 through line 19 containing valve 20 and are directed into hydrogen-hydrogen chloride stripper 21 wherein the hydrogen and hydrogen chloride are separated from the isopentane, unconverted normal pentane and higher boiling hydrocarbons. The hydrogen-hydrogen chloride mixture is withdrawn through line 52 containing valve 53 to receiver 54 wherein any entrained liquid is separated therefrom. The hydrogen-hydrogen chloride mixture substantially free from any liquid hydrocarbons is withdrawn from receiver 54 through line 57 and is directed into either reactor 15 or hydrogen chloride absorber 12, as hereinbefore set forth. The entrained liquid is withdrawn from receiver 54 through line 55 containing valve 56 and commingled with the hydrocarbon stream in line 19.

The isopentane, normal pentane and higher boiling hydrocarbon mixture, substantially free of hydrogen and hydrogen chloride is withdrawn from stripper 21 through line 22 containing valve 23 and is directed into fractionator 24 wherein the isopentane is separated from the higher boiling hydrocarbons and unconverted pentane and withdrawn through line 61 containing valve 62, condensed and recovered as a product of the reaction. The unconverted normal pentane and higher boiling hydrocarbons containing small amounts of aluminum chloride dissolved therein are withdrawn through line 7 and recycled to aluminum chloride tower 9. A portion of this stream may be directed into either lines 10 or 13 through lines 74 and 76 containing valves 75 and 77, respectively. To prevent a build-up of heavier hydrocarbons within the system, a portion is withdrawn through line 25 containing valve 26 and aluminum chloride treater 27 and is subsequently separated from the normal pentane in fractionator 33, as hereinbefore set forth. The unconverted normal pentane along with the fresh charge is recycled to aluminum chloride tower 9 through line 36. A portion of this stream may be directed into lines 10 and 13 through lines 38 and 40 containing valves 39 and 41 respectively.

Since the isomerization reaction is an exothermic reaction, it is necessary to provide some method for maintaining a substantially constant conversion temperature within reactor 15. This is accomplished by introducing a cool portion of the stream from line 36 into line 43 through valve 42 into the various quench lines, namely lines 44, 46 and 48 containing valves 45, 47 and 49 respectively. The hydrogen and hydrogen chloride necessary for starting the isomerization reaction and small amounts of make-up during the operation are introduced through line 59 containing valve 60 to line 57.

It is to be understood that the above description is merely illustrative of the invention and is not to be construed as a limitation thereof except in so far as the same is defined in the appended claims.

I claim as my invention:

1. An isomerization process which comprises subjecting a saturated hydrocarbon to isomerizing conditions in a reaction zone in the presence of a metallic halide catalyst of the Friedel-Crafts type, a hydrogen halide and hydrogen, removing the resultant products from said zone and separating therefrom a gas containing hydrogen and hydrogen halide, simultaneously with the foregoing operation passing a saturated hydrocarbon liquid through a catalyst supply zone containing a metallic halide of the Friedel-Crafts type and therein dissolving at least a portion of the catalyst in said liquid, maintaining the last-named zone under hydrogen pressure whereby to dissolve hydrogen in the hydrogen-catalyst solution, removing a liquid solution comprising hydrocarbon liquid, dissolved catalyst, and only the amount of hydrogen soluble therein from the supply zone and contacting said gas therewith to dissolve hydrogen halide in the solution and to separate hydrogen from hydrogen halide, introducing thus separated hydrogen to the catalyst supply zone, and supplying the solution from the contacting step to said reaction zone.

2. An isomerization process which comprises subjecting a paraffinic hydrocarbon to isomerizing conditions in a reaction zone in the presence of an aluminum halide, a hydrogen halide and hydrogen, removing the resultant products from said zone and separating therefrom a gas containing hydrogen and hydrogen halide, simultaneously with the foregoing operation passing a paraffinic liquid through a catalyst supply zone containing an aluminum halide and therein dissolving aluminum halide in said liquid, maintaining the last-named zone under hydrogen pressure whereby to dissolve hydrogen in the solution of aluminum halide in paraffinic liquid, removing a liquid solution comprising paraffinic liquid, dissolved aluminum halide, and only the amount of hydrogen soluble therein from the supply zone and contacting said gas therewith to dissolve hydrogen halide in the solution and to separate hydrogen from hydrogen halide, introducing thus separated hydrogen to the catalyst supply zone, and supplying the solution from the contacting step to said reaction zone.

3. An isomerization process which comprises subjecting a paraffinic hydrocarbon to isomerizing conditions in a reaction zone in the presence of aluminum chloride, hydrogen chloride and hydrogen, removing the resultant products from said zone and separating therefrom a gas containing hydrogen and hydrogen chloride, simultaneously with the foregoing operation passing a paraffinic liquid through a catalyst supply zone containing aluminum chloride and therein forming a solution of aluminum chloride in said liquid, maintaining the last-named zone under hydrogen pressure whereby to dissolve hydrogen in said solution, removing a liquid solution containing only the amount of hydrogen soluble therein from the supply zone and contacting said gas therewith to dissolve hydrogen chloride in the solution and to separate hydrogen from hydrogen chloride, introducing thus separated hydrogen to the catalyst supply zone, and supplying the solution from the contacting step to said reaction zone.

4. An isomerization process which comprises introducing a saturated hydrocarbon in substantially liquid phase into a catalyst supply zone containing a metal halide isomerizing catalyst of the Friedel-Crafts type and therein dissolving at least a portion of the catalyst in said hydrocarbon, maintaining said zone under hydrogen pressure, withdrawing from said zone a liquid hydrocarbon stream containing dissolved metal halide catalyst and only the amount of hydrogen soluble in said stream, subjecting said stream to isomerizing conditions to effect isomerization of said saturated hydrocarbon, separating hydrogen from the resultant reaction products, and introducing thus separated hydrogen to said catalyst supply zone.

5. The process of claim 4 further characterized in that the isomerization is carried out in the presence of a hydrogen halide.

6. An isomerization process which comprises passing a saturated hydrocarbon in substantially liquid phase downwardly through a catalyst supply zone containing a metal halide isomerizing catalyst of the Friedel-Crafts type and therein dissolving at least a portion of the catalyst in said hydrocarbon, introducing hydrogen into said catalyst supply zone and maintaining said zone under hydrogen pressure, maintaining a liquid level in said catalyst supply zone during the passage of said hydrocarbon therethrough, withdrawing from a point below the liquid level in said catalyst supply zone a liquid hydrocarbon stream containing dissolved metal halide catalyst and dissolved hydrogen, introducing said stream and a hydrogen halide promoter into a reaction zone and therein effecting isomerization of said saturated hydrocarbon, separating hydrogen and hydrogen halide from the resultant isomerization products, and returning thus separated hydrogen to said catalyst supply zone.

7. An isomerization process which comprises passing a saturated hydrocarbon in substantially liquid phase downwardly through a catalyst supply zone containing a metal halide isomerizing catalyst of the Friedel-Crafts type and therein dissolving at least a portion of the catalyst in said hydrocarbon, introducing hydrogen into said catalyst supply zone and maintaining said zone under hydrogen pressure, maintaining a liquid level in said catalyst supply zone during the passage of said hydrocarbon therethrough, withdrawing from a point below the liquid level in said catalyst supply zone a liquid hydrocarbon stream containing dissolved metal halide catalyst and dissolved hydrogen, passing said stream downwardly through a reaction zone, introducing a hydrogen halide promotor into said reaction zone and effecting isomerization of said saturated hydrocarbon therein, maintaining a liquid level in said reaction zone during the passage of the reactants therethrough, withdrawing from a point below the liquid level in said reaction zone a liquid stream comprising isomerization products, unconverted hydrocarbon, dissolved hydrogen, and dissolved hydrogen halide, separating said dissolved hydrogen and hydrogen halide, returning thus separated hydrogen to said catalyst supply zone, and returning thus separated hydrogen halide to said reaction zone.

8. The process of claim 7 further characterized in that a mixture of hydrogen and hydrogen halide is separated from the liquid stream withdrawn from said reaction zone, the liquid hydrocarbon stream withdrawn from said catalyst supply zone is contacted with said mixture to substantially completely absorb hydrogen halide therefrom, the resultant solution of hydrogen halide in said liquid hydrocarbon stream is supplied to said reaction zone, and the unabsorbed hydrogen substantially free of hydrogen halide is introduced into said catalyst supply zone.

9. The process of claim 6 further characterized in that said metal halide comprises aluminum chloride and said hydrogen halide comprises hydrogen chloride.

10. The process of claim 7 further characterized in that said metal halide comprises aluminum chloride and said hydrogen halide comprises hydrogen chloride.

11. The process of claim 4 further characterized in that said saturated hydrocarbon comprises normal pentane.

12. The process of claim 4 further characterized in that said saturated hydrocarbon boils within the gasoline range.

13. The process of claim 4 further characterized in that the temperature in said catalyst supply zone is within the range of 100° F. to 300° F.

14. The process of claim 6 further characterized in that said reaction zone contains a solid packing material.

15. An isomerization process which comprises introducing a saturated hydrocarbon in substantially liquid phase into a catalyst supply zone containing a metal halide isomerizing catalyst of the Friedel-Crafts type and therein dissolving at least a portion of the catalyst in said hydrocarbon, maintaining said zone under hydrogen pressure, withdrawing from said zone a liquid hydrocarbon stream containing dissolved metal halide catalyst and only the amount of hydrogen soluble in said stream, subjecting said stream to isomerizing conditions in a reaction zone to effect isomerization of said saturated hydrocarbon, maintaining a liquid level and a gaseous atmosphere of hydrogen in said reaction zone, withdrawing from said reaction zone a liquid hydrocarbon stream containing only the amount of hydrogen soluble in said stream, separating hydrogen from the resultant reaction products, and introducing thus separated hydrogen to said catalyst supply zone.

16. The process of claim 6 further characterized in that a liquid level and a gaseous atmosphere of hydrogen are maintained in said reaction zone and a liquid hydrocarbon stream containing dissolved hydrogen and hydrogen halide is withdrawn from said reaction zone.

JOHN O. IVERSON.